(12) United States Patent
Geens et al.

(10) Patent No.: US 11,221,453 B2
(45) Date of Patent: Jan. 11, 2022

(54) CABLE FIXATION DEVICES AND METHODS

(71) Applicant: COMMSCOPE CONNECTIVITY BELGIUM BVBA, Kessel-Lo (BE)

(72) Inventors: Johan Geens, Bunsbeek (BE); Pieter Vermeulen, Westerlo (BE); Bart Vos, Geel (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/755,022

(22) PCT Filed: Oct. 9, 2018

(86) PCT No.: PCT/EP2018/077372
§ 371 (c)(1),
(2) Date: Apr. 9, 2020

(87) PCT Pub. No.: WO2019/072782
PCT Pub. Date: Apr. 18, 2019

(65) Prior Publication Data
US 2020/0348477 A1    Nov. 5, 2020

Related U.S. Application Data

(60) Provisional application No. 62/569,887, filed on Oct. 9, 2017.

(51) Int. Cl.
*G02B 6/00* (2006.01)
*G02B 6/44* (2006.01)

(52) U.S. Cl.
CPC .................. *G02B 6/4452* (2013.01)

(58) Field of Classification Search
CPC .... G02B 6/3893; G02B 6/3825; G02B 6/387; G02B 6/00; H01R 13/2421
See application file for complete search history.

(56) References Cited

U.S. PATENT DOCUMENTS

| 5,566,269 | A | 10/1996 | Eberle, Jr. et al. |
| 6,695,491 | B1 | 2/2004 | Leeman et al. |
| 6,853,796 | B2 | 2/2005 | Vastmans et al. |
| 7,418,181 | B2 * | 8/2008 | Zimmel .................. G02B 6/46 385/135 |

(Continued)

FOREIGN PATENT DOCUMENTS

| JP | H11-122758 A | 4/1999 |
| WO | 02097505 A1 | 12/2002 |

OTHER PUBLICATIONS

International Search Report and Written Opinion of the International Searching Authority for International Patent Application No. PCT/EP2018/077372 dated Jan. 29, 2019, 14 pages.

*Primary Examiner* — Jennifer Doan
(74) *Attorney, Agent, or Firm* — Merchant & Gould P.C.

(57) ABSTRACT

A cable management structure for holding cable holders in a telecommunications equipment cabinet includes a base, a first pair of sidewalls extending from the base, and a ramp terminating in a shoulder at each end of each sidewall. The first pair of sidewalls define a space for holding one or more cable holders, and the shoulder of each sidewall prevents a cable holder from sliding out of the space once the cable holder is inserted between the first pair of sidewalls.

16 Claims, 12 Drawing Sheets

(56) References Cited

U.S. PATENT DOCUMENTS

| | | | |
|---|---|---|---|
| 9,709,765 B2* | 7/2017 | Wells | H04Q 1/023 |
| 10,866,378 B2 | 12/2020 | Geens et al. | |
| 2005/0002633 A1 | 1/2005 | Solheid et al. | |
| 2011/0280535 A1 | 11/2011 | Womack | |
| 2016/0080836 A1* | 3/2016 | Carreras Garcia | H01R 24/62 |
| | | | 439/638 |

* cited by examiner

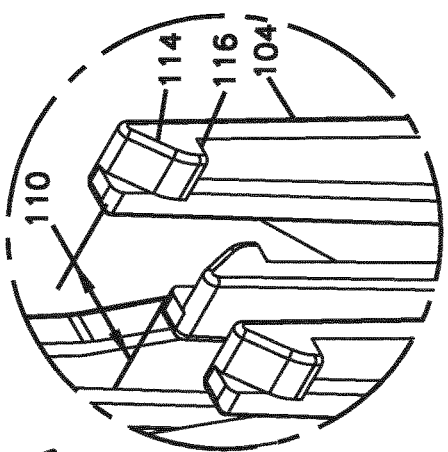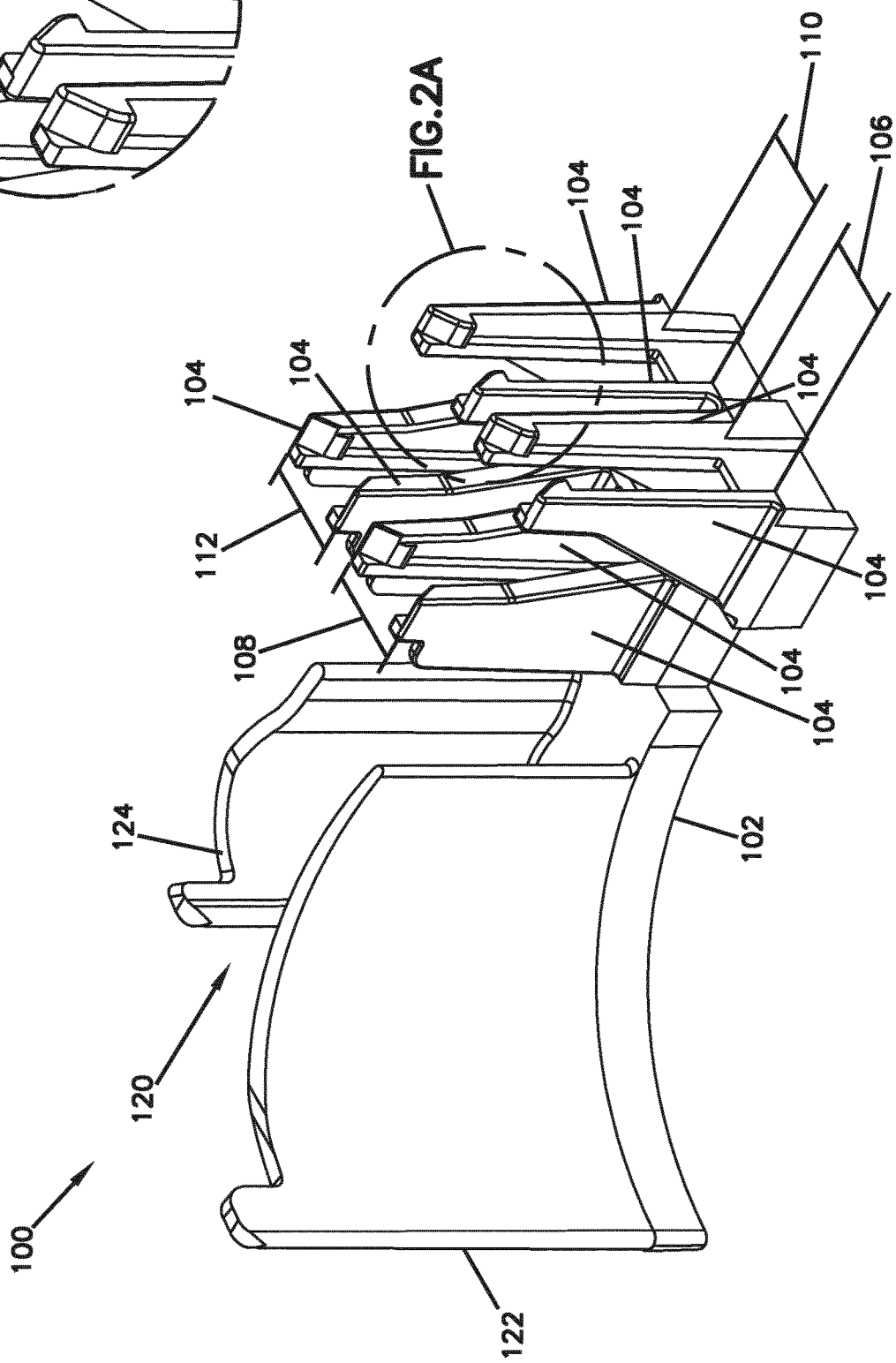

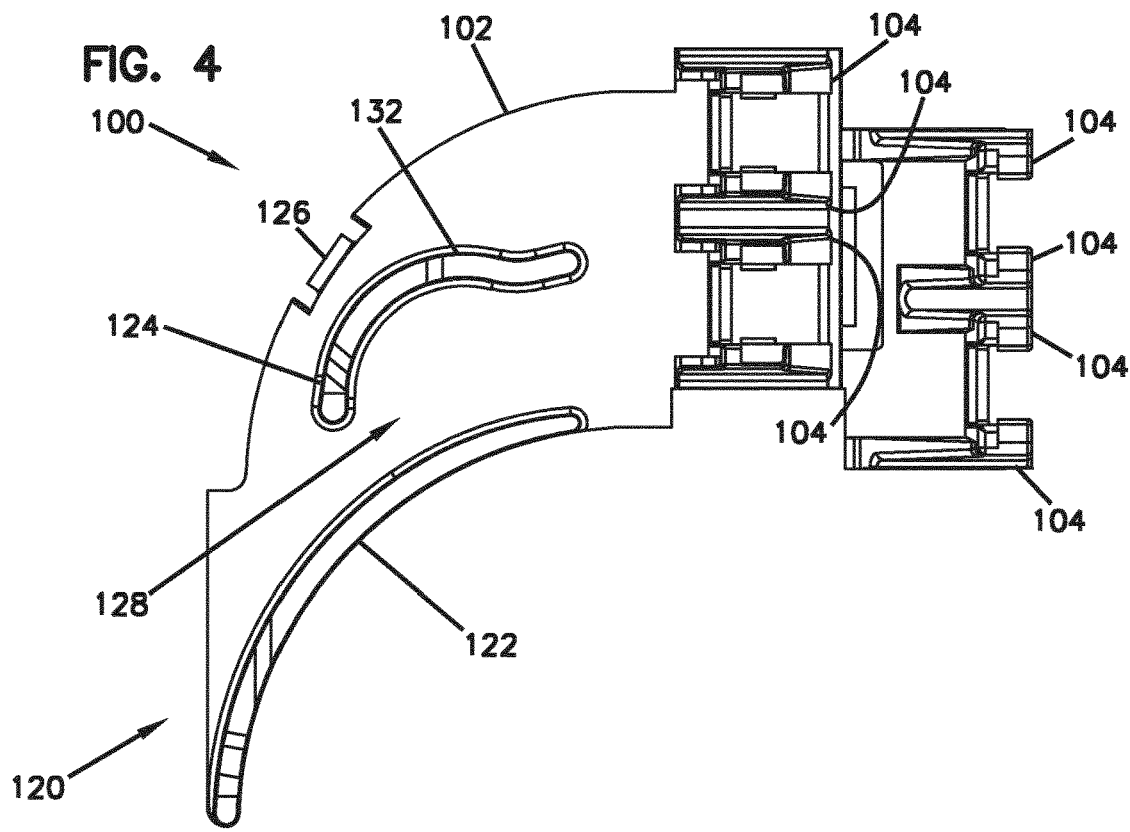
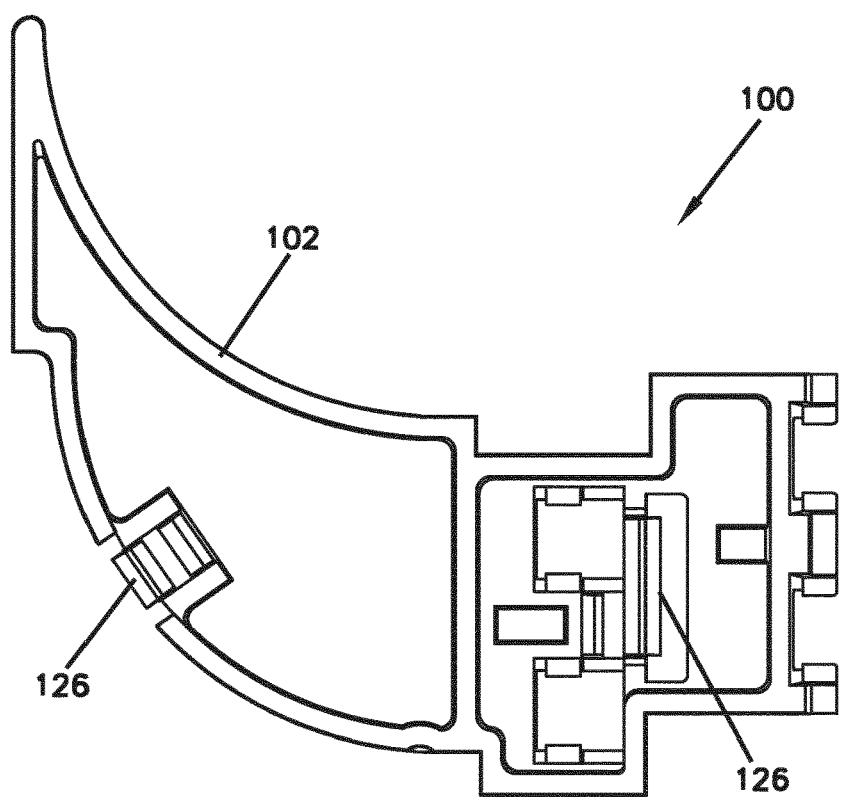

FIG. 12A
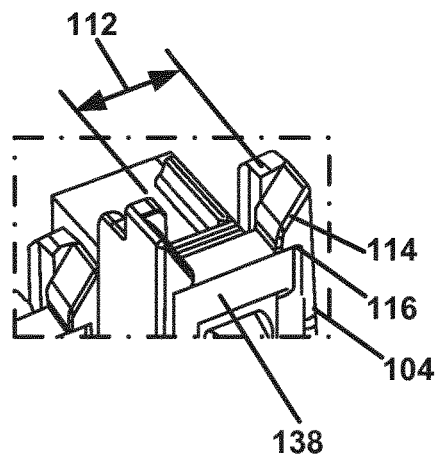
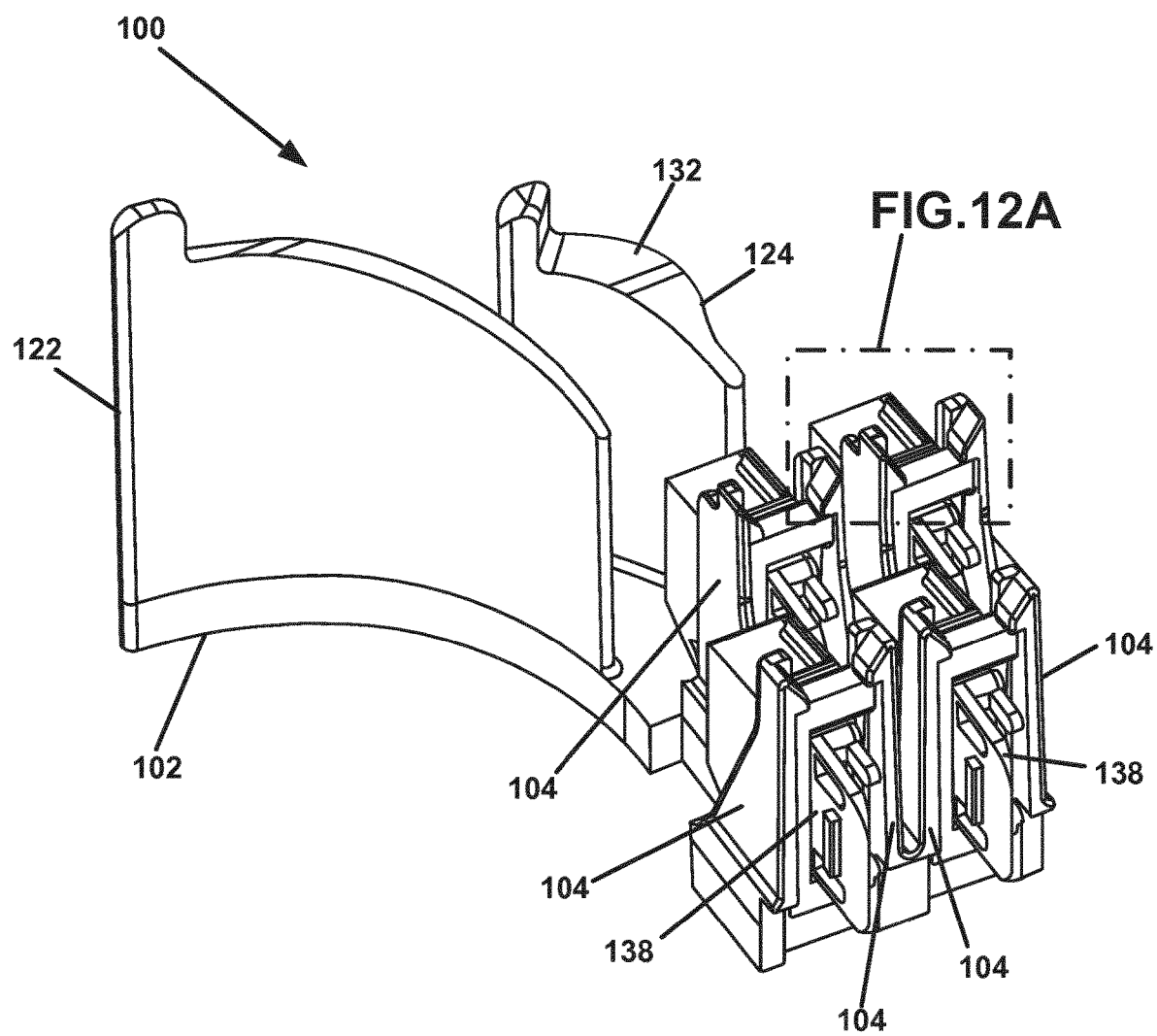

CABLE FIXATION DEVICES AND METHODS

CROSS-REFERENCE TO RELATED APPLICATION

This application is a National Stage Application of PCT/EP2018/077372, filed on Oct. 9, 2018, which claims the benefit of U.S. Patent Application Ser. No. 62/569,887, filed on Oct. 9, 2017, the disclosures of which are incorporated herein by reference in their entireties. To the extent appropriate, a claim of priority is made to each of the above disclosed applications.

TECHNICAL FIELD

This disclosure relates to optical fibers and to the organization of optical fibers. More specifically, this disclosure relates to cable management structures for fiber optic cables in a telecommunications equipment cabinet.

BACKGROUND

Cable management structures are often included in telecommunications cabinets for holding fiber optic cables before they reach a splice area. The splice area splices the fiber optic cables to additional cables before they reach a consumer. The cable management structures include multiple parts including covers to help prevent the fiber optic cables from falling out of the structures and to prevent damage to the optical fibers within the cables. Improvements in reducing the number of parts and protecting the optical fibers in the fiber optic cables, without losing functionality, are desirable.

SUMMARY

In one aspect, the disclosed technology relates to a cable management structure for holding cable holders in a telecommunications equipment cabinet. The cable management structure includes a base, a first pair of sidewalls extending from the base, and a ramp terminating in a shoulder at each end of each sidewall. The first pair of sidewalls define a space for holding one or more cable holders, and the shoulder of each sidewall prevents a cable holder from sliding out of the space once the cable holder is inserted between the first pair of sidewalls.

In one example, the space between the first pair of sidewalls is configured to receive four cable holders. In another example, the cable management structure includes a second pair of sidewalls located in a staggered position with respect to the first pair of sidewalls. In another example, the cable management structure includes a third pair of sidewalls located in an adjacent position with respect to the first pair of sidewalls. In another example, the cable management structure includes a fourth pair of sidewalls located in an adjacent position with respect to the second pair of sidewalls. In one example, each shoulder includes a surface configured to contact against a surface on a cable holder. In another example, the ramp of each sidewall extends at an acute angle with respect to the length of each sidewall. In one example, the cable management structure includes a latch that hinges about an axis and grips a catch on an opposite side of the cable management structure. In another example, the cable management structure includes a radius limiter extending from the base, the radius limiter having a long sidewall and a short sidewall that define an axial pathway between, wherein the short sidewall has an irregular curved shape. In one example, the short sidewall of the radius limiter has a central portion that extends in a direction having a larger radius of curvature. In another example, the width of the short sidewall of the radius limiter expands in the central portion.

In another aspect, the disclosed technology relates to a method for managing cables in a telecommunications equipment cabinet, the method including attaching a cable management structure to a surface of the telecommunications equipment cabinet, the cable management structure having a base, a first pair of sidewalls extending from the base, and a ramp terminating in a shoulder at each end of each sidewall, and inserting a cable holder between the first pair of sidewalls by sliding the cable holder along the ramp of each sidewall and past a point beyond the shoulder of each sidewall.

In one example, the method includes inserting additional cable holders between the first pair of sidewalls. In one example, the method includes inserting additional cable holders between a second pair of sidewalls, the second pair of sidewalls being located in a staggered position with respect to the first pair of sidewalls. In one example, the method includes inserting additional cable holders between a third pair of sidewalls, the third pair of sidewalls being located in an adjacent position with respect to the first pair of sidewalls. In one example, the method includes inserting additional cable holders between a fourth pair of sidewalls, the fourth pair of sidewalls being located in an adjacent position with respect to the second pair of sidewalls.

In another aspect, the disclosed technology relates to a cable management system for a telecommunications equipment cabinet, the system includes at least one fiber optic cable attached to a cable holder; and a cable management structure having: a base; a first pair of sidewalls extending from the base; and a ramp terminating in a shoulder at each end of each sidewall; wherein the first pair of sidewalls define a space for holding the cable holder, and the shoulder of each sidewall prevents the cable holder from sliding out of the space once the cable holder is inserted between the first pair of sidewalls.

In one example, the cable management system includes more than one cable holder held in the space between the first pair of sidewalls. In another example, the cable management system includes a second pair of sidewalls located in a staggered position with respect to the first pair of sidewalls, and at least one cable holder is held in a space between the second pair of sidewalls. In one example, the cable management system has a radius limiter extending from the base of the cable management structure, the radius limiter having a long sidewall and a short sidewall that define an axial pathway between; the short sidewall has an irregular curved shape.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 2 is a front perspective view of a cable management structure in accordance with the present disclosure.

FIG. 2A is an enlarged view of a portion of the cable management structure of FIG. 2.

FIG. 4 is a top view of the cable management structure of FIG. 2.

FIG. 5 is a bottom view of the cable management structure of FIG. 2.

FIG. 12 is a front perspective view of the cable management structure holding multiple cable holders of a second type.

FIG. 12A is an enlarged view of a portion of the cable management structure of FIG. 12.

DETAILED DESCRIPTION

Figure 1:
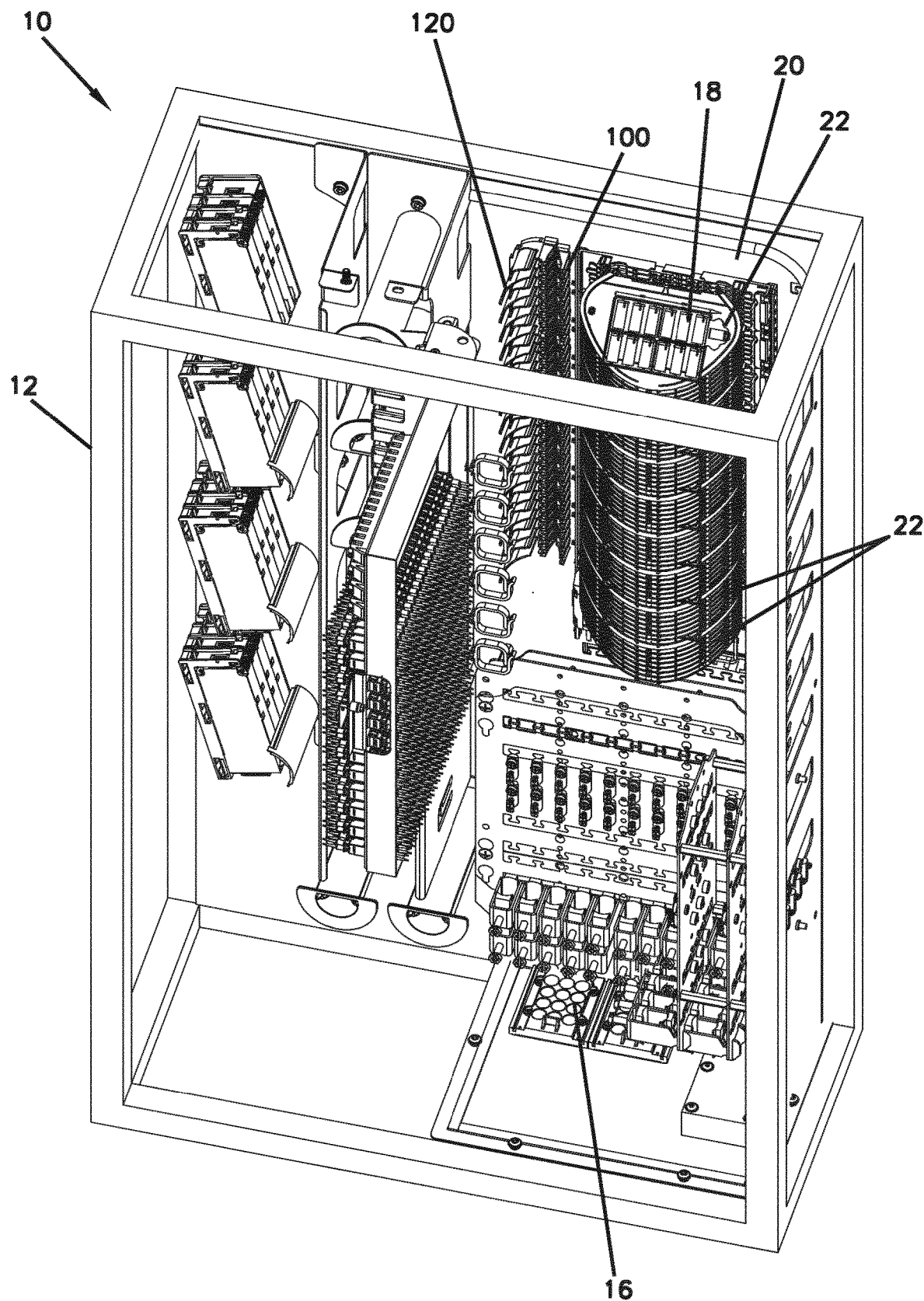
FIG. 1 is a perspective view of an exemplary telecommunications equipment cabinet having multiple cable management structures attached to the rear of the cabinet.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an exemplary embodiment of a cabinet 10 for housing telecommunications equipment. The cabinet 10 includes a frame 12 defining an interior for holding or mounting various telecommunications equipment. In the example illustrated, the cabinet 10 is generally rectangular; however, the shape and size of the cabinet 10 may vary as needed or desired for a particular application.

Fiber optic cables 14 are routed into the cabinet 10 via a cable port area 16. The cabinet 10 includes various structures for routing, organizing, and managing the fiber optic cables 14. For example, multiple cable management structures 100 are attached to a rear wall 20 of the cabinet 10 adjacent to a splice area 18. Fiber optic cables 14 feed into radius limiters 120 of the cable management structures 100, and cable holders 136 attached to the fiber optic cables 14 are held by the cable management structures 100 adjacent to the splice area 18. A cable holder 136 is used for holding the aramid yarns of a fiber optic cable 14 after the jacket of the fiber optic cable 14 has been stripped for exposing the optical fiber core of the fiber optic cable 14. By holding the aramid yarns of the fiber optic cables 14, the cable holders 136 absorb forces applied to the fiber optic cables 14 (e.g., pulling or tugging forces) to protect the optical fiber cores within the fiber optic cables 14. The splice area 18 includes a series of splice trays 22 which are used for splicing the fiber optic cables 14 to additional cables in the cabinet 10.

Figure 3:
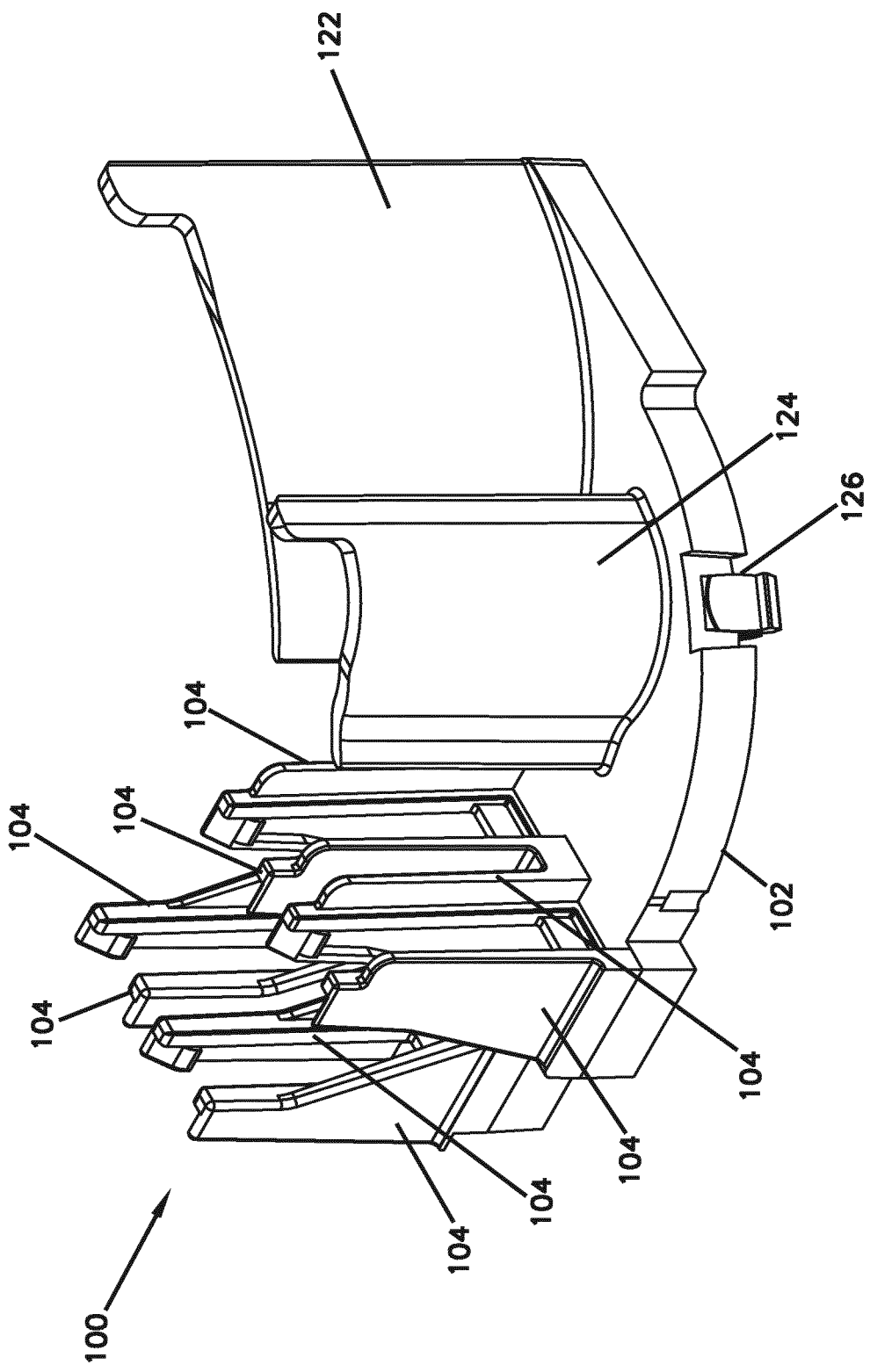
FIG. 3 is a rear perspective view of the cable management structure of FIG. 2.

FIGS. 2 and 3 illustrate front and rear perspective views, respectively, of a cable management structure 100. The cable management structure 100 includes a base 102. Extending from the base 102 are several pairs of sidewalls 104. Each pair of sidewalls 104 defines a space for holding one or more cable holders 136 (depicted in FIGS. 10-13) which are attached to the fiber optic cables 14 in the manner described above.

In the example embodiment depicted in FIG. 2, four pairs of sidewalls 104 are illustrated, and the pairs of sidewalls 104 are depicted as having a staggered relationship with one another. For example, a first pair 106 of sidewalls is depicted, followed by a second pair 108 of sidewalls located in a staggered position with respect to the first pair 106 of sidewalls. A third pair 110 of sidewalls is located in a position adjacent to the first pair 106 of sidewalls, and a fourth pair 112 of sidewalls is located in a position adjacent to the second pair 108 of sidewalls. The depiction in the figures of the pairs 106, 108, 110, and 112 of sidewalls 104 is exemplary, and it is contemplated that the number of pairs of sidewalls 104, and their orientation with respect to one another may vary as needed or desired for a particular application.

FIG. 2A is an enlarged view of the third pair 110 of sidewalls 104. The enlarged view illustrates that each end of each sidewall 104 includes a ramp 114 terminating in a shoulder 116. The ramp 114 facilitates the insertion of cable holders 136 into the space defined between each pair of sidewalls 104 by providing a surface on which each cable holder 136 can slide along until reaching a point past the shoulder 116 of each sidewall 104. The ramp 114 of each sidewall 104 may extend at an acute angle with respect to the length of each sidewall 104.

Once received in the space defined by a pair of sidewalls 104, the shoulders 116 prevent each cable holder 136 from sliding out of the cable management structure 100. Accordingly, the shoulders 116 eliminate the need for a cover, such as a channel cable holder, for covering the cable holders 136 when held in cable management structure 100. Although the shoulders 116 are depicted as having a flat surface perpendicular to the length of each sidewall 104, it is contemplated that the shoulders 116 may not have a flat perpendicular surface. For example, in alternative embodiments the shoulders 116 may have a rounded surface, or may have a surface that is not perpendicular to the length of each sidewall 104.

FIG. 4 illustrates a top view of the cable management structure 100. Referring now to FIGS. 2, 3, and 4 the cable management structure 100 includes a radius limiter 120 extending from the base 102. The radius limiter 120 includes a long sidewall 122 and a short sidewall 124 that define an axial pathway 128 between. The long and short sidewalls 122, 124 guide the fiber optic cables 14 in the axial pathway 128 before they reach splice area 18 of the cabinet 10.

The long sidewall 122 has a curved surface having an approximately uniform radius of curvature. The short sidewall 124 has an irregular curved surface such that it does not have a uniform radius of curvature. For example, the short sidewall 124 has a central portion that extends in a direction having a larger radius of curvature. The axial pathway 128 between the long and short sidewalls 122, 124 prevents the fiber optic cables 14 from bending in sharp turns and from being pulled at an angle with respect to the sidewalls 104 of the cable management structure 100. For example, a pull of a cable 14 held by the cable management structure 100 will result in an axial pull of the cable 14 along a longitudinal axis of the sidewalls 104 rather than an angled pull with respect to the sidewalls 104. This may help prevent damage to the optical fiber cores within the cables 14. In some embodiments, the width of the short sidewall 124 is maintained through the central portion 132 (e.g., FIGS. 2 and 4). In alternative embodiments, the width of the short sidewall 124 may expand in central portion 132 (e.g., FIGS. 10-13) for increasing the width of the short sidewall 124. Although the figures show only the short sidewall 124 as having an irregularly curved shape, it is contemplated that in some embodiments the long sidewall 122 may also have an irregularly curved shape.

Figure 8:
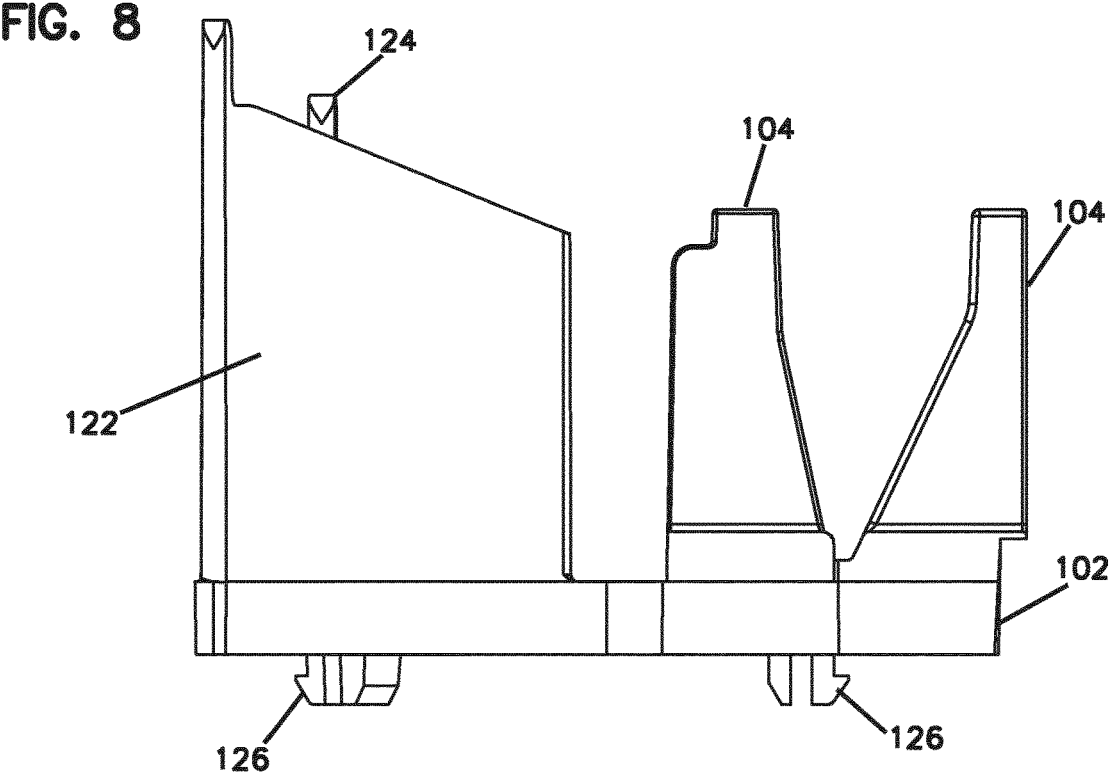
FIG. 8 is a front view of the cable management structure of FIG. 2.
Figure 9:
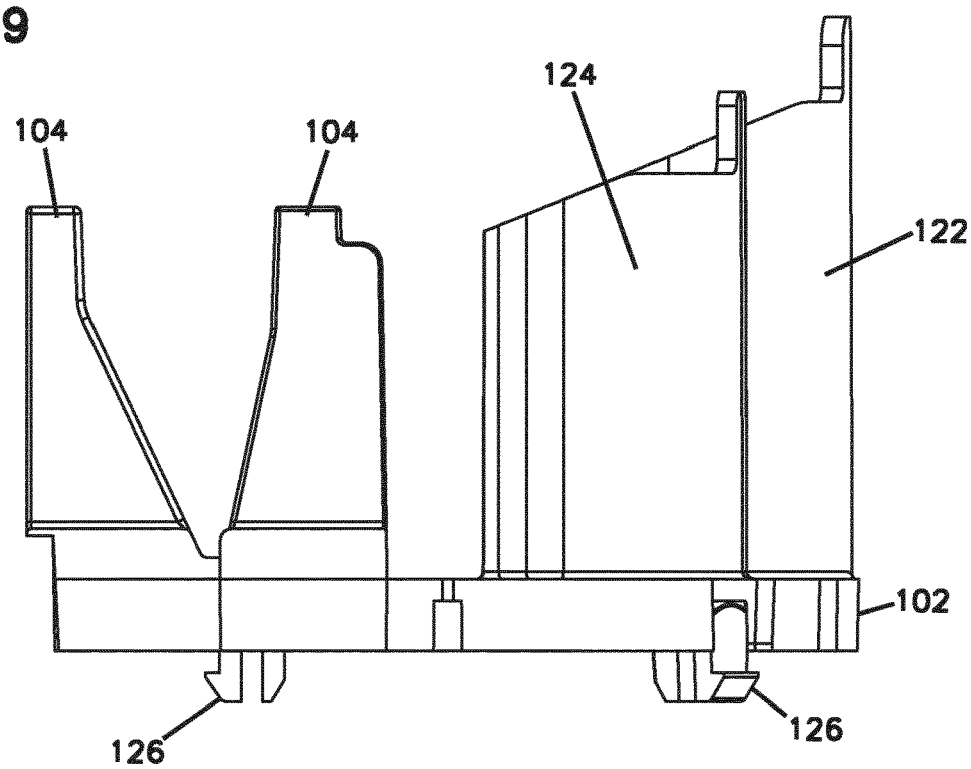
FIG. 9 is a rear view of the cable management structure of FIG. 2.

Referring now to FIGS. 3, 5, 8, and 9, the base 102 of the cable management structure 100 may include clips 126 to facilitate attaching the cable management structure 100 to the rear wall 20 of the cabinet 10. For example, the cable management structure 100 may include two clips 126; a first clip 126 disposed toward the rear edge of the base 102 (as depicted in FIG. 3) and a second clip 126 disposed in the base 102 underneath the pairs of sidewalls 104 (as depicted in FIGS. 5, 8, and 9). The clips 126 may snap onto corresponding holes or cutouts in the rear wall 20. In addition to, or as an alternative to using the clips 126, it is contemplated that other means may be used for attaching the cable management structure 100 to the rear wall 20 of the cabinet 10 such as by screwing the cable management structure 100 onto the rear wall 20.

Figure 6:
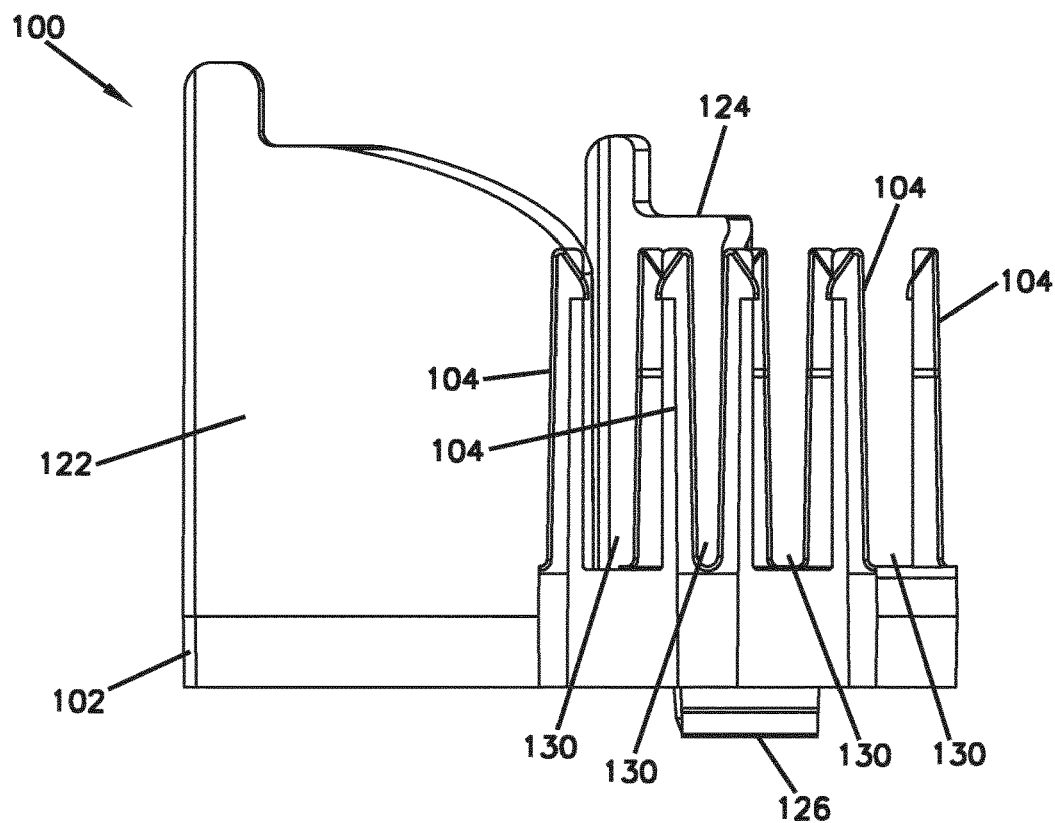
FIG. 6 is a left side view of the cable management structure of FIG. 2.
Figure 7:
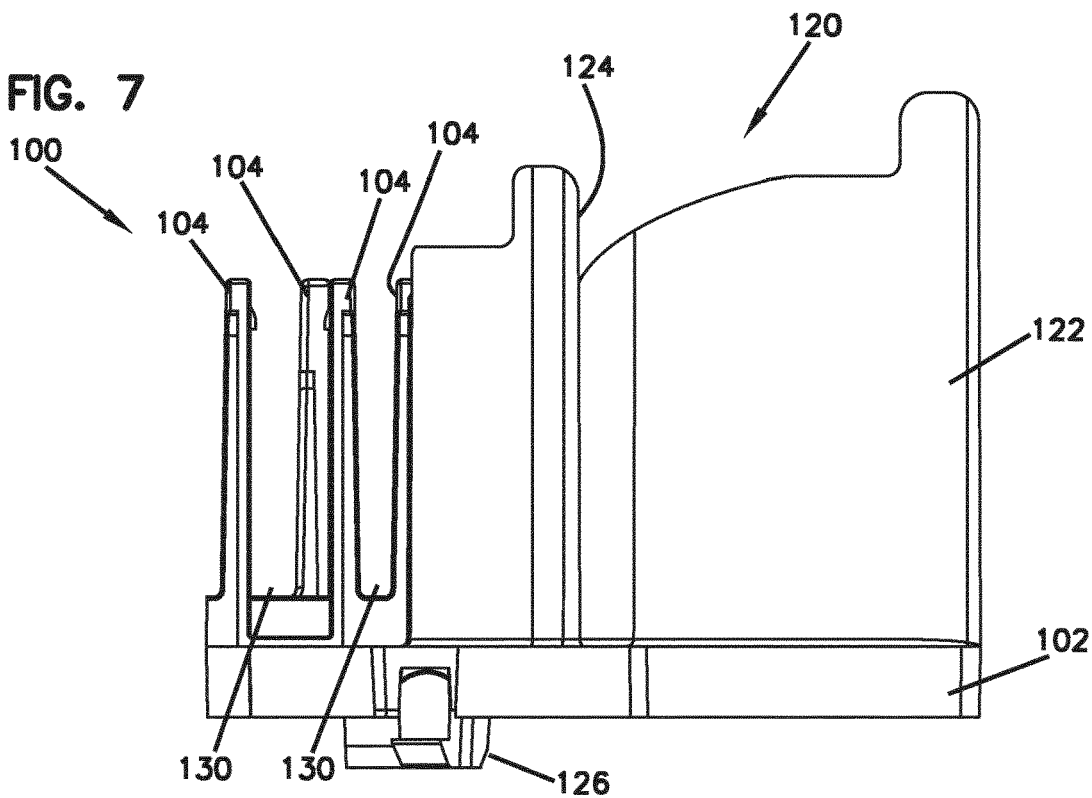
FIG. 7 is a right side view of the cable management structure of FIG. 2.

FIG. 6 depicts a left side view of the cable management structure 100, and FIG. 7 depicts a right side view of the cable management structure 100. As illustrated in FIG. 6, the staggered pairs of sidewalls 104 define spaces 130 for guiding the fiber optic cables 14 before they reach splice area 18 of the cabinet 10. As illustrated in FIG. 7, the long and short sidewalls 122, 124 of the radius limiter 120 provide a smooth bending transition for the fiber optic cables 14 before they reach the sidewalls 104 of the cable management structure 100 and the splice area 18.

FIG. 8 depicts a front view of the cable management structure 100, and FIG. 9 depicts a rear view of the cable management structure 100. These figures depict the clips 126 attached to the base 102 of the cable management structure 100 that may be used to attach the cable management structure 100 to the rear wall 20 of the cabinet 10, as described above.

Figure 10A:
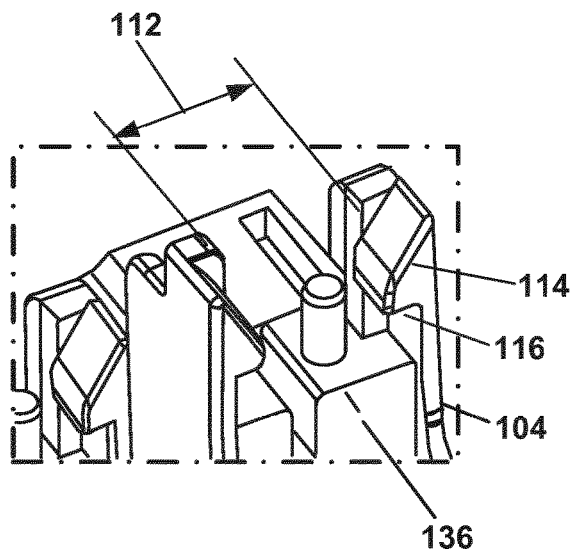
FIG. 10A is an enlarged view of a portion of the cable management structure of FIG. 10.
Figure 10:
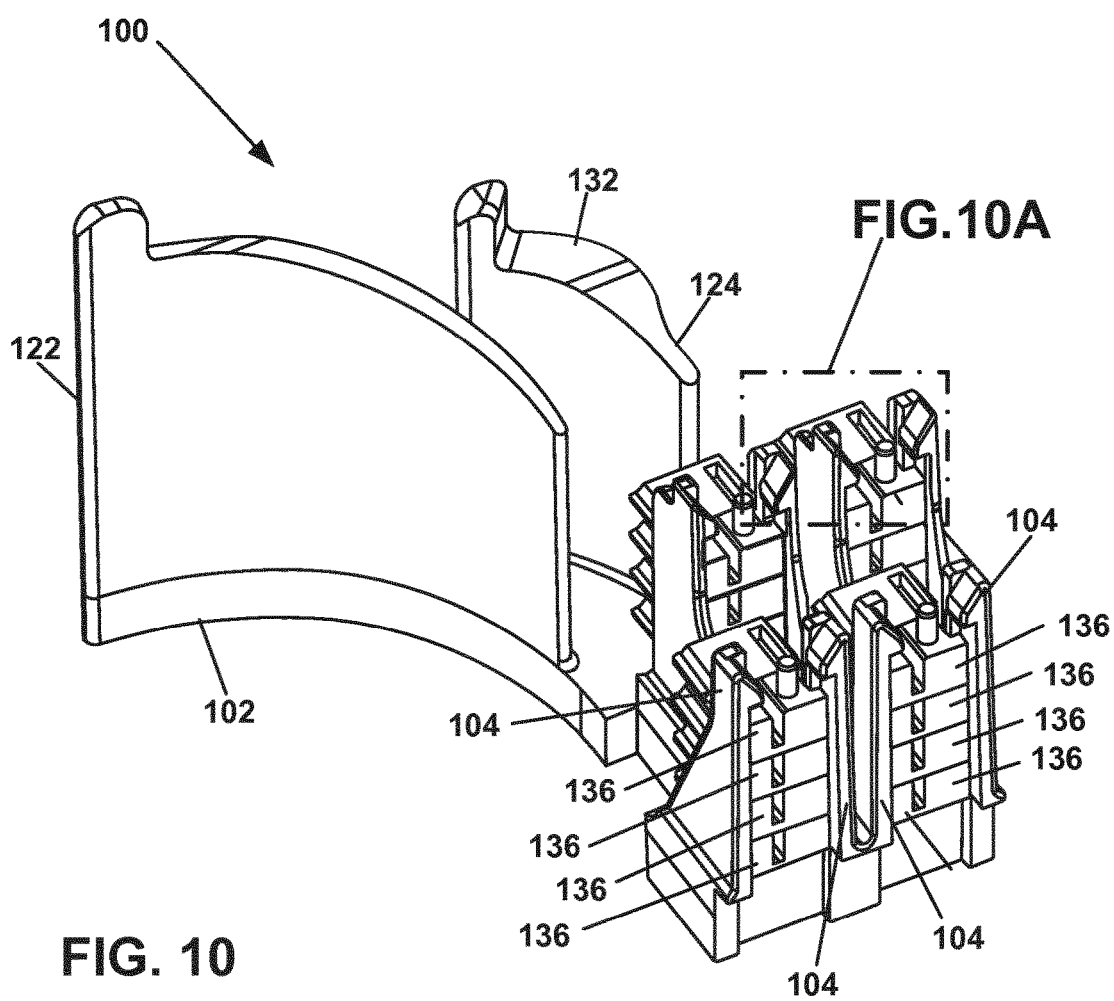
FIG. 10 is a front perspective view of the cable management structure holding multiple cable holders of a first type.
Figure 11:
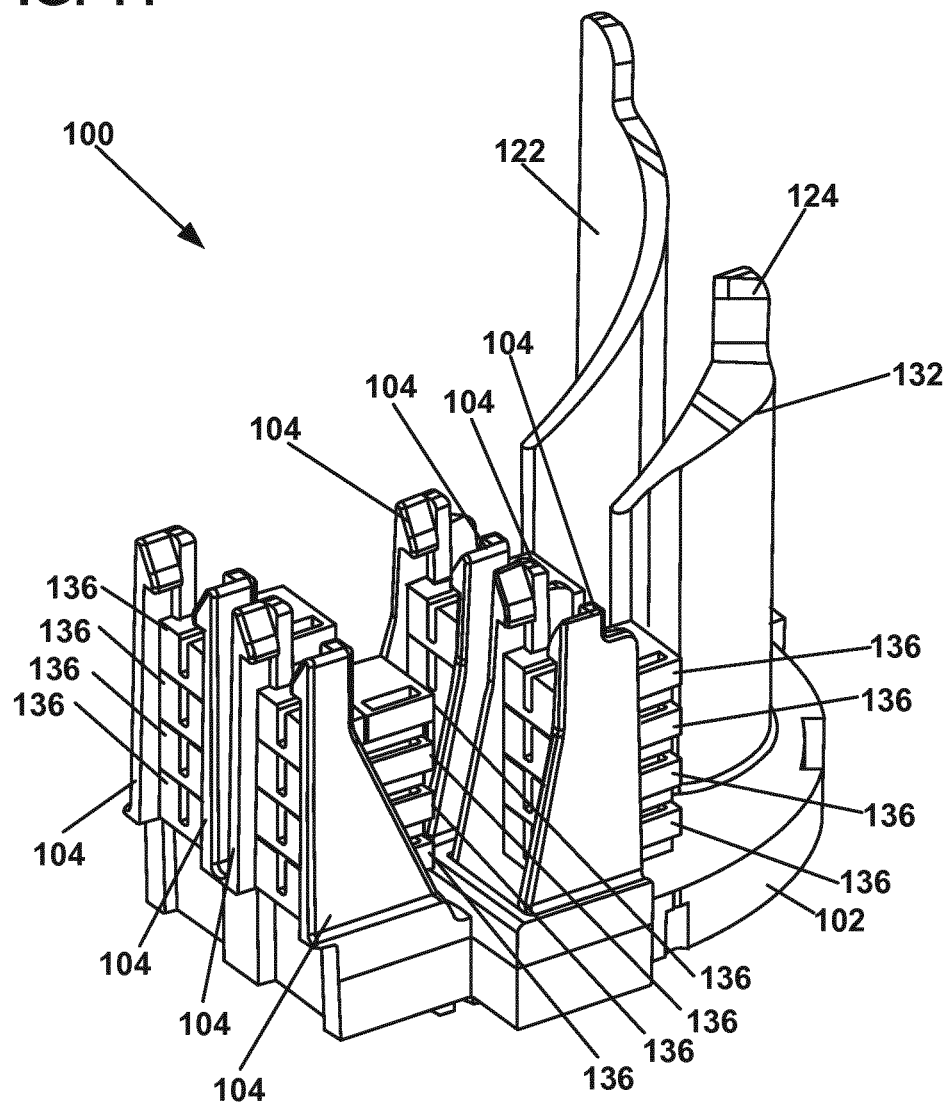
FIG. 11 is a rear perspective view of the cable management structure holding multiple cable holders of the first type.

FIGS. 10 and 11 depict front and rear perspective views of the cable management structure 100 holding multiple cable holders 136. The cable holders 136 depicted in FIGS. 10 and 11 are miniaturized cable holders that each hold one fiber optic cable 14. The cable holders 136 are held in the spaces defined between the pairs of sidewalls 104.

FIG. 10A is an enlarged view of a portion of FIG. 10. The ramp 114 of each sidewall 104 facilitates the insertion of the cable holders 136 into the cable management structure 100. For example, the ramp 114 of each sidewall 104 contacts a bottom surface of each cable holder 136 so that each cable holder 136 may slide into a space defined between a pair of sidewalls 104. Once the cable holder 136 reaches a point past the shoulders 116, the cable holder 136 is prevented from sliding out of the cable management structure 100 by the shoulders 116. Accordingly, the shoulders 116 eliminate the need for a cover over the cable management structure 100 for holding the cable holders 136 in place.

In the example embodiment depicted in FIGS. 10 and 11, the spaces between the pairs of sidewalls 104 each hold four cable holders 136, and the cable management structure 100 is depicted as holding sixteen cable holders 136. However, the number of cable holders 136 held by each space between each pair of sidewalls 104 may vary as needed or desired for a particular application. Accordingly, each space between each pair of sidewalls 104 may hold fewer than four cable holders 136. Also, in alternative embodiments, the space between each pair of sidewalls 104 may hold more than four cable holders 136.

Figure 13:
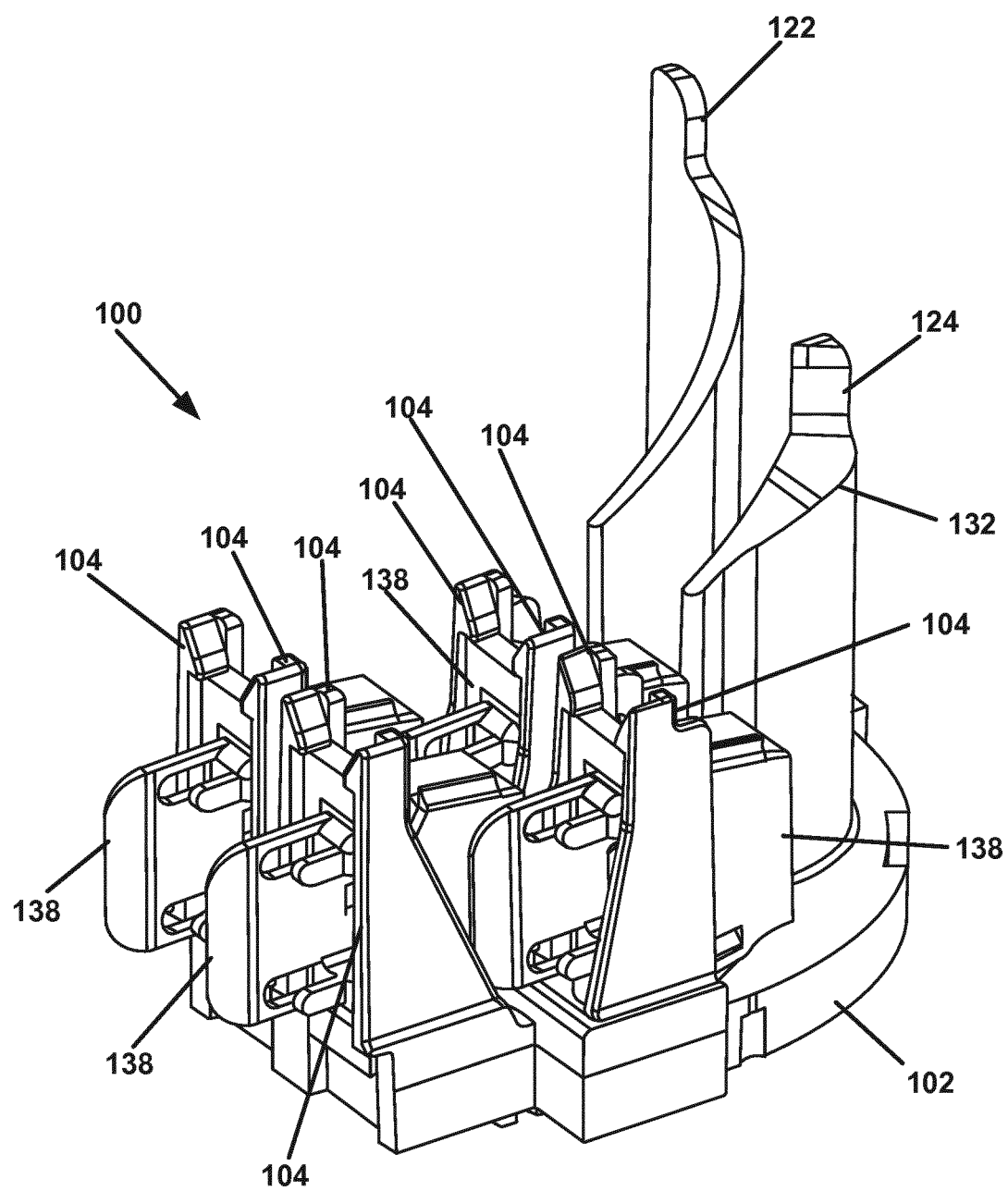
FIG. 13 is a rear perspective view of the cable management structure holding multiple cable holders of the second type.

FIGS. 12 and 13 depict front and rear perspective views of the cable management structure 100 holding cable holders 138. The cable holders 138 are larger than the cable holders 136, and are capable of holding more than one fiber optic cable 14.

FIG. 12A is an enlarged view of a portion of FIG. 12. Each sidewall 104 includes a ramp 114 to help insert the cable holders 138 into the spaces defined by the pairs of sidewalls 104, and each sidewall 104 also includes a shoulder 116 for preventing the cable holders 138 from sliding out of the cable management structure 100.

In the example embodiment depicted in FIGS. 12 and 13, each space between each pair of sidewalls 104 holds one cable holder 138; however, in alternative embodiments, each space may hold more than one cable holder 138.

Figure 14:
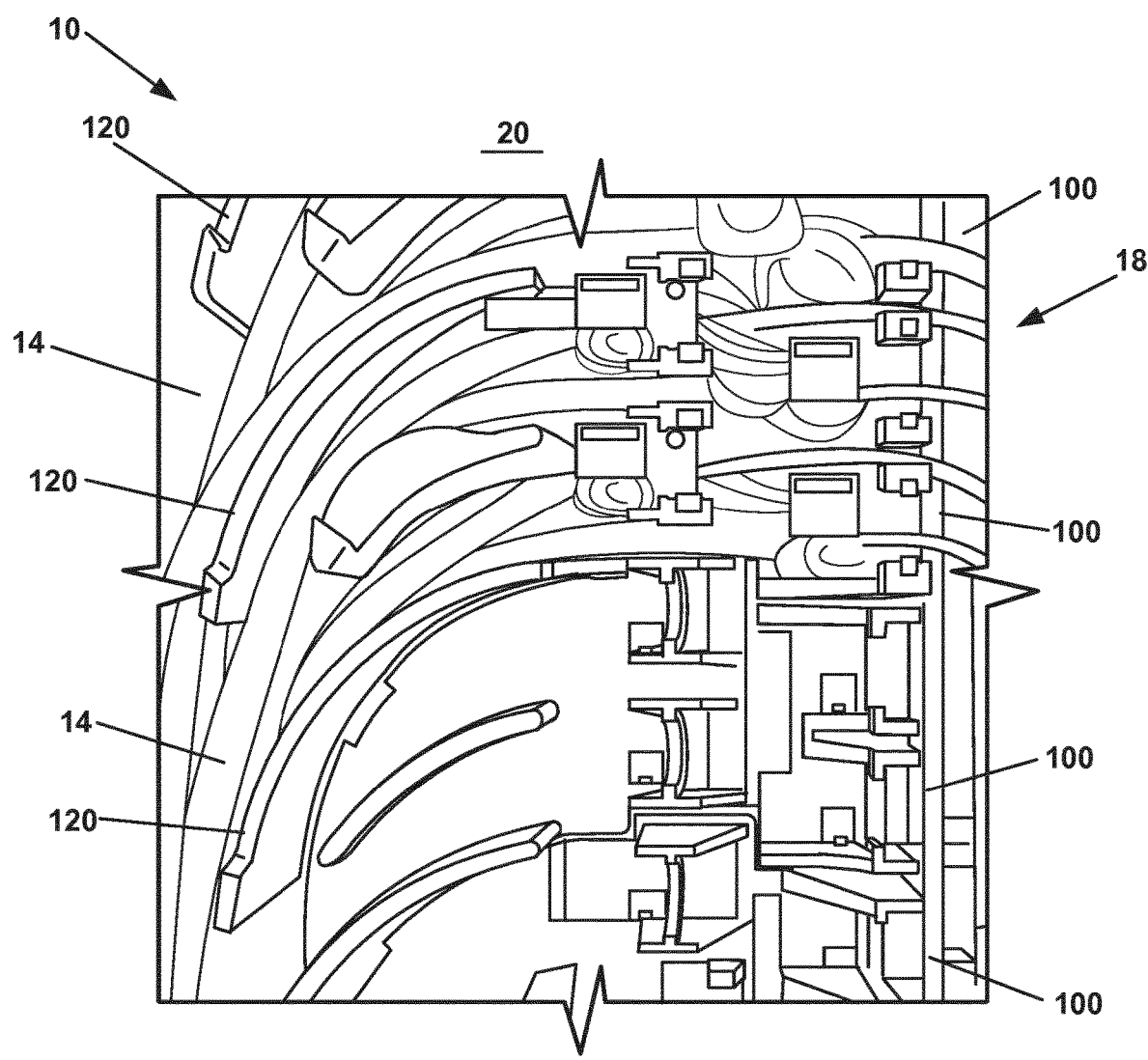
FIG. 14 is a front view showing a stack of cable management structures holding fiber optical cables in a telecommunications equipment cabinet.

Referring now to FIG. 14, a stack of cable management structures 100 are shown. The cable management structures 100 are attached to the rear wall 20 of the cabinet 10. Fiber optic cables 14 are passed through the radius limiters 120 of the cable management structures 100. Cable holders 136 are attached to each of the cables 14 and are each held in place by the pairs of sidewalls 104 of the cable management structure 100. The fiber optic cables 14 have been stripped such that the outer jacket has been removed beginning in the area around each cable holder 136. The exposed optical fiber core of each cable 14 extends into the splice area 18 so that it can be spliced with additional cables in the cabinet 10. The aramid yarn of each cable 14 is wrapped around and secured to each cable holder 136 so that the cable holders 136 and the cable managements structures 100 absorb pulling and tugging forces that may be applied to the fiber optic cables 14. This may help protect the central optical fiber core in each cable 14.

Figure 15:
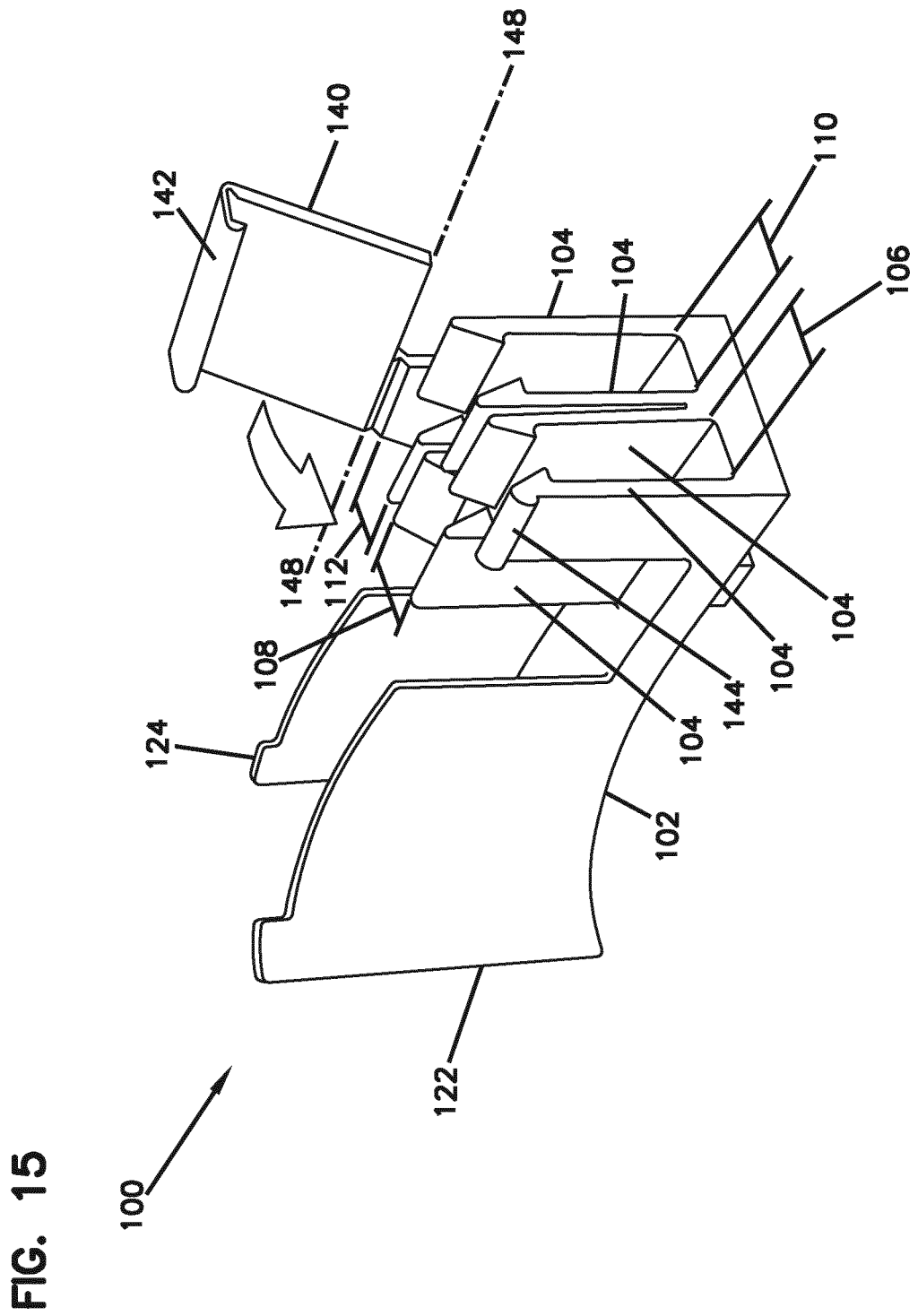
FIG. 15 is a front perspective view of an alternative embodiment of the cable management structure in accordance with the present disclosure.

Referring now to FIG. 15, an alternative embodiment of the cable management structure 100 may include a latch 140 attached to an end of at least one of the sidewalls 104. In the example depicted in FIG. 15, the latch 140 is in an open position. The latch 140 includes a clamp 142 that can grip a catch 144 located on an opposing sidewall 104. When the latch 140 hinges about the axis 148 and the clamp 142 is pressed into the catch 144, the latch 140 can cover optic fiber cables 14 held by the cable management structure 100 and this may help to further protect the cables 14 and to prevent the cables 14 from sliding out of the cable management structure 100. In the example depicted in FIG. 15, the latch 140 is attached to the outer sidewall 104 of the fourth pair 112 of sidewalls and the catch 144 is located on an outer sidewall 104 of the first pair 106 of sidewalls; however, it is contemplated that the location and orientation of the latch 140 and catch 144 may vary as need or required for a particular application. For example, the latch 140 may be attached to a different sidewall 104 including any of the sidewalls 104 of the cable management structure 100, and similarly, the catch 144 can be located on any of the sidewalls 104. Also, the latch 140 can be attached to more than one sidewall 104.

Still referring to FIG. 15, the shape of the sidewalls 104 in the alternative embodiment may differ from the shape of sidewalls depicted in FIGS. 2-13. For example, the shape of the sidewalls 104 in the alternative embodiment of FIG. 15 is substantially rectangular. In the alternative embodiment of FIG. 15, the ramp 114 and shoulder 116 on each end of each sidewall 104 extend the entire length of the sidewall 104, and have a surface area larger than the ramps 114 and shoulders 116 depicted in FIGS. 2-13. The increased surface area in the alternative embodiment of FIG. 15 may help to more securely hold the cable holders 136, 138 between the pairs of sidewalls 104 in the cable management structure 100.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A cable management structure for holding cable holders in a telecommunications equipment cabinet, the cable management structure comprising:
    a base;
    a first pair of sidewalls extending from the base; and
    a ramp terminating in a shoulder at each end of each sidewall;
    wherein the first pair of sidewalls define a space for holding one or more cable holders, and the shoulder of each sidewall prevents a cable holder from sliding out of the space once the cable holder is inserted between the first pair of sidewalls.

2. The cable management structure according to claim 1, wherein the space between the first pair of sidewalls is configured to receive four cable holders.

3. The cable management structure according to claim 1, further comprising a second pair of sidewalls located in a staggered position with respect to the first pair of sidewalls.

4. The cable management structure according to claim 3, further comprising a third pair of sidewalls located in an adjacent position with respect to the first pair of sidewalls.

5. The cable management structure according to claim 4, further comprising a fourth pair of sidewalls located in an adjacent position with respect to the second pair of sidewalls.

6. The cable management structure according to claim 1, wherein each shoulder includes a surface configured to contact against a surface on a cable holder.

7. The cable management structure according to claim 1, wherein the ramp of each sidewall extends at an acute angle with respect to the length of each sidewall.

8. The cable management structure according to claim 1, further comprising a latch that hinges about an axis and grips a catch on an opposite side of the cable management structure.

9. The cable management structure according to claim 1, further comprising a radius limiter extending from the base, the radius limiter having a long sidewall and a short sidewall that define an axial pathway between; wherein the short sidewall has an irregular curved shape.

10. The cable management structure according to claim 9, wherein the short sidewall of the radius limiter has a central portion that extends in a direction having a larger radius of curvature.

11. The cable management structure according to claim 10, wherein the width of the short sidewall of the radius limiter expands in the central portion.

12. A cable management system for a telecommunications equipment cabinet, the system comprising:
    at least one fiber optic cable attached to a cable holder, wherein each cable holder holds aramid yarns of a fiber optic cable after a jacket of the fiber optic cable is stripped for exposing an optical fiber core of the fiber optic cable; and
    a cable management structure having:
        a base;
        a first pair of sidewalls extending from the base; and
        a ramp terminating in a shoulder at each end of each sidewall;
    wherein the first pair of sidewalls define a space for holding the cable holder, and the shoulder of each sidewall includes a surface configured to contact against a surface on a cable holder to prevent the cable holder from sliding out of the space once the cable holder is inserted between the first pair of sidewalls.

13. The cable management system according to claim 12, further comprising more than one cable holder held in the space between the first pair of sidewalls.

14. The cable management system according to claim 12, further comprising a second pair of sidewalls located in a staggered position with respect to the first pair of sidewalls, and at least one cable holder is held in a space between the second pair of sidewalls.

15. The cable management system according to claim 12, further comprising a radius limiter extending from the base of the cable management structure, the radius limiter having a long sidewall and a short sidewall that define an axial pathway between; wherein the short sidewall has an irregular curved shape.

16. The cable management system according to claim 12, wherein the surface of the shoulder at each end of each sidewall prevents the cable holder from sliding out of the space defined between the first pair of sidewalls in a direction orthogonal to the base.

* * * * *